(12) United States Patent
Stata et al.

(10) Patent No.: US 7,278,111 B2
(45) Date of Patent: Oct. 2, 2007

(54) SYSTEMS AND METHODS FOR SELECTING A DATE OR RANGE OF DATES

(75) Inventors: Raymond P. Stata, Palo Alto, CA (US); Maram Nagendra Prasad, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 833 days.

(21) Appl. No.: 10/330,898

(22) Filed: Dec. 26, 2002

(65) Prior Publication Data
US 2004/0125137 A1 Jul. 1, 2004

(51) Int. Cl.
*G06K 15/00* (2006.01)
(52) U.S. Cl. ................................ 715/771; 715/856
(58) Field of Classification Search ........ 715/771–773, 715/970, 730–732, 526, 765, 856–862, 764; 705/26; 707/5
See application file for complete search history.

(56) References Cited

U.S. PATENT DOCUMENTS

| | | | | |
|---|---|---|---|---|
| 5,440,730 | A | 8/1995 | Elmasri et al. | 395/600 |
| 5,515,490 | A | 5/1996 | Buchanan et al. | 395/154 |
| 5,892,507 | A * | 4/1999 | Moorby et al. | 715/500.1 |
| 5,930,797 | A | 7/1999 | Hill | 707/101 |
| 6,039,355 | A | 3/2000 | Durand | 283/2 |
| 6,188,396 | B1 | 2/2001 | Boezeman et al. | 345/302 |
| 6,204,840 | B1 * | 3/2001 | Petelycky et al. | 715/500.1 |
| 6,340,978 | B1 | 1/2002 | Mindrum | 345/764 |
| 6,360,188 | B1 | 3/2002 | Freidman et al. | 703/1 |
| 6,389,418 | B1 | 5/2002 | Boyack et al. | 707/6 |
| 6,392,651 | B1 | 5/2002 | Stradley | 345/473 |
| 6,407,739 | B1 | 6/2002 | Wen | 345/440 |
| 6,414,686 | B1 | 7/2002 | Protheroe et al. | 345/474 |
| 6,544,294 | B1 * | 4/2003 | Greenfield et al. | 715/526 |
| 6,654,030 | B1 * | 11/2003 | Hui | 715/720 |
| 6,678,698 | B2 * | 1/2004 | Fredell et al. | 707/104.1 |
| 6,996,782 | B2 * | 2/2006 | Parker et al. | 715/764 |
| 2002/0040313 | A1 * | 4/2002 | Hunter et al. | 705/9 |
| 2002/0055880 | A1 * | 5/2002 | Unold et al. | 705/26 |
| 2003/0065721 | A1 * | 4/2003 | Roskind | 709/204 |
| 2003/0200217 | A1 * | 10/2003 | Ackerman | 707/9 |
| 2004/0027368 | A1 * | 2/2004 | Snyder et al. | 345/716 |

(Continued)

OTHER PUBLICATIONS

Allan, R.B., "Interactive Timelines as Information System Interfaces," *Proceedings of International Symposium on Digital Libraries*, Tsukuba, Ibaraki, Japan, 1995, 175-180.

(Continued)

*Primary Examiner*—Steven Sax
(74) *Attorney, Agent, or Firm*—Hickman Palermo Truong & Becker LLP (57) ABSTRACT

Systems and methods for selecting a time/date, or a range of times/dates are provided. In one aspect, systems and methods having non-linear timeline UI mechanism(s) for selecting a date, or selecting a date range, are provided. In recognition that user interaction with and recall of time varies depending upon how far away the time period of interest is from the present time, the non-linear timeline provides UI mechanism(s) for selecting a time having different granularities of time in different portions of the timeline. Additionally, in recognition that user interaction with dates and times is not always in terms of numbers, but rather in terms of events, etc., occurring at or around a particular time period of interest, systems and method having date relation UI techniques are provided.

26 Claims, 7 Drawing Sheets

U.S. PATENT DOCUMENTS

| | | | |
|---|---|---|---|
| 2004/0125124 A1* | 7/2004 | Kim et al. | 345/716 |
| 2004/0268224 A1* | 12/2004 | Balkus et al. | 715/500.1 |
| 2005/0086188 A1* | 4/2005 | Hillis et al. | 706/50 |
| 2005/0160113 A1* | 7/2005 | Sipusic et al. | 707/104.1 |

OTHER PUBLICATIONS

Combi, C., "Representing Absolute Time Expressions with Vagueness, Indeterminancy, and Different Granularities," *AAAI 2000 Workshop on Spatial and Temporal Granularity*, 2000, Technical Report WS-00-08, 17-22.

Furnas, G.W., "Generalized Fisheye Views," *Human Factors in Computing Systems: CHI '86 Conference Proceedings*, Boston, Massachusetts, Apr. 13-17, 1986, 16-23.

Hornsby, K., "Shifting Granularity Over Geospatial Lifelines," *AAAI 2000*, 2000, 33-36.

Veltman, K.H., "Goals of Culture and Art," *The Wall Chart of World History*, Deacon and Co., Bracken Books, London, 1988, 53 pages.

Johnson, B. et al., "Tree-Maps: A Space-Filling Approach to the Visualization of Hierarchical Information Structures," *Proceedings Visualization '91*, San Diego, California, Oct. 22-25, 1991, 284-291.

Ning, P. et al., "An Algebraic Representation of Calendars," *AAAI 2000 Workshopon Spatial and Temporal Granularity*, 2000, Technical Report WS-00-08, 1-8.

Plaisant, C. et al., "An Information Architecture to Support the Visualization of Personal Histories," *Inf. Proc. & Management*, 1988, 34(5), 581-597.

Sarkar, M. et al., "Graphical Fisheye Views of Graphs," *CHI '92 Conference Proceedings: Striking a Balance*, Monterey, California, May 3-7, 1992, 83-91.

Bettini, C. and Montanari, A. (Cochairs), AAAI Workshop Technical Report WS-00-08, http://www.aaai.org/Press/Reports/Workshops/ws-00-08.html, Austin, Texas, Jul. 2000, Abstract and Contents, 2 pages.

Anger, F.D. (Chair), AAAI Workshop Technical Report WS-97-11, http://www.aaai.org/Press/Reports/Workshops/ws-97-11.html, Abstract and Contents, 1997, 2 pages.

TIME Symposium/Workshops on Temporal Representation and Reasoning, http://www.informatik.uni-trier.de/~ley/db/conf/time/, 1994-2003, 2 pages of identification of symposiums.

ACM Multimedia, Proceedings of the ACM International Conference on Multimedia, http://www.informatik.uni-trier.de/~ley/db/conf/mm/, 1993-2003, 2 pages of identification of proceedings.

Human-Computer Interaction Laboratory University of Maryland at College Park, "Visualizing Personal Histories: a Workshop," Jul. 21-22, 1997, 2 page Outline of Final Program, http://www.cs.umd.edu/hcil/about/events/vphprogram.html.

Allen, R.B., "Interactive Timelines as Information System Interfaces," http://raven.umd.edu/~rba/PAPERS/TL/tl.html, 1995, 7 pages.

Goldwave, Incorporated, informational pages regarding corporation products and product features and details, http://www.goldwave.com/, 2002, 15 pages.

\* cited by examiner

SYSTEMS AND METHODS FOR SELECTING A DATE OR RANGE OF DATES

FIELD OF THE INVENTION

The present invention is directed to systems and methods for selecting a date or time, or a range of dates or time. More particularly, the present invention is directed to user interface (UI) mechanism(s) enabling the selection of date(s)/time(s) in a computing system in an improved manner.

BACKGROUND OF THE INVENTION

The specification of dates is becoming an increasingly important part of UIs of any application in which a date range is part of a query, or part of a predicate that selects specific information out of a larger collection of information. For instance, the specification of dates and/or times, or ranges of dates and/or times, is becoming an increasingly important part of UIs of "interactive applications," including computer software applications, interactive Internet applications, interactive TV applications, search engines, VCRs, DVRs, etc. Exemplary user acts that can implicate the selection of such a range include selecting emails, documents, photos, financial transactions, television shows, or movies out of large collections of the same and selecting a range of dates/times in scheduling applications, such as calendars for personal use or for use in connection with travel Web sites.

Specifying date ranges, however, is currently problematic for a variety of reasons. One problem is that time can be difficult to represent graphically in a concise manner. For example, the overall universe from which one may want to select a date range can often be quite long—years or even decades. Representing this universe concisely is difficult, especially when high or multiple resolutions are desired, e.g., to the hour or minute or in connection with limited display space. Moreover, the recall of dates in the specific form of calendar dates is difficult for most people. Instead, people are better at recalling dates as being connected with events—"the time I went fishing with Bob."

One common current approach for selecting dates is sometimes referred to as component-wise selection. With component-wise selection, one selects a date by specifying year, month, day, and possibly other time components individually by selecting from a list, by typing, or by a combination of both. This is common in Web sites, such as travel Web sites, wherein a user is asked to specify a date for travel. Typically, in such a scenario, a user selects a month (a first component) of travel from a list of twelve months. A user also selects the day (a second component) of the month, from a list of total days for that month, or more generically, from a list of possibly 31 days. Then, a user selects a year (a third component) of travel. The user may also express a time of day in hours (a fourth component) to travel. In this sense, each of the components represents a different granularity for the user to hone or home in on a date. In this regard, granularity refers to a way of representing time at different scales, like day, month, or year; however, the selection of four or more different components can be tedious, particularly if more than one date, e.g., departure and return travel dates, must be entered. While this approach in some sense addresses the granularity problem, namely that different selections using the same user interface may implicate vastly different periods of time, this approach does not work well for an application wherein the user is unsure of the date being selected. If the user is searching for a date the user is unsure of, honing in on an exact date via component-wise selection is not very useful in finding an appropriate date range, and would implicate many trial and error repeat entries by the user to find a useful range.

Another common current approach is sometimes referred to as a "calendar picker" mechanism. With a calendar picker, one enters a date by picking it off of a graphical representation of a calendar. Often, this is a "month-at-a-time" calendar, with arrow buttons to allow one to move between different months. This type of picker is typical for entering a single date rather than a range; however, the week-at-a-time and day-at-a-time views often seen in calendar programs are also of this type of picker, in which case they can be used for picking a range. While calendar pickers do provide a graphical representation of time, they do not do so in a manner that scales for either a large universe of times, or for a wide variety of granularities. The calendar picker also does not address the above-identified recollection problem, namely that sometimes users do not remember events or occurrences for which they may be searching as "a date" that fits into a "calendar."

While both of the commonly used current approaches, i.e., component-wise and calendaring, address the general problem of specifying dates, neither is adequate for both ease of use or fast selection of dates. Additionally, neither approach adequately addresses the recollection problem.

Most other existing work falls into the following categories: (a) the use of temporal attributes for directing retrieval of information from temporal or multi-media databases or objects, (b) the use of timelines to visualize large bodies of temporal information, wherein a timeline is a graphical or textual display of events in chronological order and is an important technique for representation of large temporal data sets.

For instance, R. B. Allen's "Interactive Timelines as Information Systems Interfaces" (August 1995) discloses using temporal attributes of a query or a context to drive a search, for retrieval and browsing of relevant information. Allen's work uses temporal attributes of information as useful interfaces for digital libraries and interactive textbooks. C. W. Deacon's "The Wall Chart of World History" (1988) discloses the use of temporal alignment and interrelationships of events to drive the retrieval of information from larger event databases.

Catherine Plaisant's and Ben Shneiderman's "An Information Architecture to Support the Visualization of Personal Histories" (1998) discloses some techniques on visualization of timelines relating to "visualization of personal histories." In this regard, the work of Plaisant and Shneiderman discloses a technique for intuitive visualization of personal history data using graphical timelines, wherein personal history data involves groups of events that are aggregated into facets, e.g., doctor visits, hospitalizations or lab tests.

Some audio-editing programs also include a time UI mechanism to select a snippet out of a song. For instance, a song is displayed as a timeline (linear), which allows a user to select a "left" and "right" edge of the clip, e.g., by clicking on the left and right mouse buttons. In this case, however, the user is picking a "relative time," i.e., a time relative to the start of the song, but a date or a date range is not being selected. Thus, in addition to being linear timelines, these are directed at selecting parts of particular multi-media objects. Other ways of visualizing timelines that make better use of available screen space involve curves and distortion techniques such as fisheye, hierarchical or log nonlinearities. G. W. Furnas' "Generalized Fisheye Views" (1986) and M. Sarkar's and M. H. Brown's "Graphical Fisheye Views of Graphs" (1992) disclose fish-eye view techniques, which optimize, i.e., distort, the screen real estate to provide an appropriate level of display context, tapering off nonlinearly while moving away from a current focus level.

B. Johnson's and B. Shneiderman's "Tree-Maps: A Space Filling Approach to the Visualization of Hierarchical Information Structures" (1991) discloses hierarchical timeline displays, which facilitate zoom-out and zoom-in between overviews and details. In log transformations, the time axis is transformed to log scale to allow extremely large duration entities to be shown along with relatively short duration entities. Other existing work, such as temporal reasoning work, discloses logical reasoning with time at multiple granularities, but is not concerned with homing in on a particular date or time range.

As mentioned, granularity is a way of representing time at different scales, like day, month, or year. X. Peng Ning's, Sean Wang's and Sushil Jajodia's "An Algebraic Representation of Calendars" (2000) and Carlo Combi's "Representing Absolute Time Expressions with Vagueness, Indeterminacy and Different Granularities" (2000) disclose techniques for logically representing such granularities and being able to perform logical operations over these representations. The formalisms of Ning, Wang and Jajodia, and Combi, however, are not concerned with visual representations to an end user. Rather, their disclosure relates to logical representations of time for temporal reasoning engines.

Accordingly, there is a need for an improved mechanism that makes it easier and faster for users to specify dates and ranges of dates. Additionally, there is a need for an improved date selection mechanism that addresses different granularities of time. Still further, there is a need for an improved date selection mechanism that addresses the problem of linking user associations with a date, and the date itself.

SUMMARY OF THE INVENTION

In view of the foregoing, the present invention is directed to systems and methods for selecting a time/date, or a range of times/dates. In one aspect, the invention provides non-linear timeline UI mechanism(s) for selecting a date, or selecting a date range. In recognition that user interaction with and recall of time varies depending upon how far away the time period of interest is from the present time, the non-linear timeline provides a UI mechanism for selecting a time having different granularities of time in different portions of the timeline. Additionally, in recognition that user interaction with dates and times is not always in terms of numbers, but rather in terms of events, etc., occurring at or around a particular time period of interest, systems and method having date relation UI techniques are provided.

In various embodiments, systems and methods for selecting a date are provided including inputting a change to a selector input portion of a time indicator user interface component from a first position to a second position and from an indication of a first time to an indication of a second time, wherein the difference from the first time to the second time changes non-linearly with the difference from the first position to the second position. In other embodiments, systems and methods for selecting a date range are provided, including inputting a date range via a date range selection mechanism of a date range user interface component including a first input portion associated with a lower limit date of the date range and a second input portion associated with an upper limit date of the date range and inputting a change to a position of the date range from a first position to a second position via a third input portion of the date range selection mechanism, wherein the duration of time specified by the difference between the time specified by the lower limit date and the time specified by the upper limit date changes non-linearly with the difference from the first position to the second position.

Other features and embodiments of the present invention are described below.

BRIEF DESCRIPTION OF THE DRAWINGS

The systems and methods for selecting a time/date, or a range of times/dates in accordance with the present invention are further described with reference to the accompanying drawings in which.

DETAILED DESCRIPTION OF THE INVENTION

Overview

As described above, there is a need for an improved mechanism for selecting or entering date(s) to specify one or more dates, e.g., for the purpose of populating one or more date fields. In consideration of the shortcomings of the prior art, the invention provides improved UI mechanism(s) for specifying date(s) or a date range. Such mechanism(s) are relevant to many applications, and thus the invention is not to be limited to any illustrative examples described below. For instance, as mentioned, such a mechanism can apply to any application in which a date range is part of a query, or part of a predicate that selects specific information out of a larger collection of information in accordance with some selection of date(s). Examplary selection processes include the selection of emails, documents, photos, financial transactions, television shows, movies, etc. out of large collections of the same.

In one aspect, the invention provides improved visual tools for homing into and specifying a date or date range. In another aspect, the invention provides techniques for relating events to times or dates to help a user converge onto a date or time range rather than using dates or dates ranges as a sole driver of a retrieval process.

Exemplary Networked and Distributed Environments

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may be used in connection with specifying a date. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may implicate the mechanism for selecting dates in accordance with the invention.

Figure 1A:
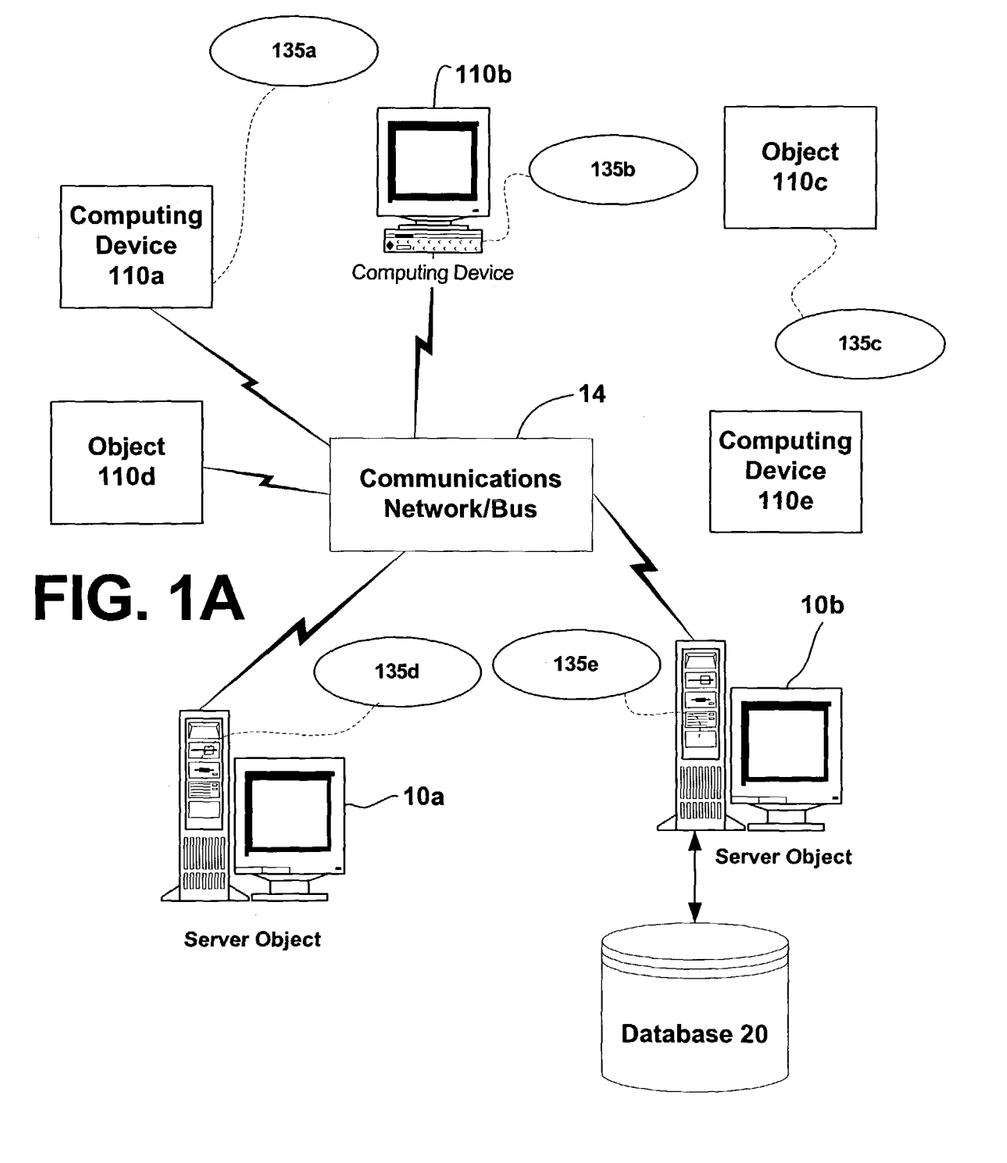
FIG. 1A is a block diagram representing an exemplary network environment having a variety of computing devices in which the present invention may be implemented.

FIG. 1A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, audio and video players, televisions, personal computers, etc. Each object can communicate with another object by way of the communications network 14. This network may itself comprise other computing objects and computing devices that provide services to the system of FIG. 1A. In accordance with an aspect of the invention, each object 10a, 10b, etc. or 110a, 110b, 110c, etc. may contain an application that might make use of an API, or other object, software or hardware, to request use of the date selection mechanism(s) of the invention.

In a distributed computing architecture, computers, which may have traditionally been used solely as clients, communicate directly among themselves and can act as both clients and servers, assuming whatever role is most efficient for the network. This reduces the load on servers and allows all of the clients to access resources available on other clients, thereby increasing the capability and efficiency of the entire network. Services that use the date selection mechanism(s) in accordance with the present invention may thus be distributed among clients and servers, acting in a way that is efficient for the entire network.

Distributed computing can help businesses deliver services and capabilities more efficiently across diverse geographic boundaries. Moreover, distributed computing can move data closer to the point where data is consumed acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, intelligent agents can be used to prioritize tasks on a network, change traffic flow, search for files locally or determine anomalous behavior such as a virus and stop it before it affects the network. All sorts of other services may be contemplated as well. Since data may in practice be physically located in one or more locations, the ability to distribute services that make use of the date selection mechanism(s) described herein is of great utility in such a system.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol, such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of sharing data, such as data accessed or utilized incident to program objects, which make use of the date selection mechanism(s) in accordance with the present invention.

Thus, FIG. 1A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to implement date selection mechanism(s).

In a network environment in which the communications network/bus 14 is the Internet, for example, the servers 10a, 10b, etc. can be Web servers with which clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment. Communications may be wired or wireless, where appropriate. The invention also considers the vast number of Web services, peer to peer networks and distributed computing frameworks that are continually evolving as platforms for the delivery of applications and services anywhere, any of which may implicate the UI selection techniques of the invention. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof, and a user might select a date with a remote control device interoperating with an on screen UI. Each client computer 110a, 110b, 110c, 110d, 110e, etc. and server computer 10a, 10b, etc. may be equipped with various application program modules or objects 135 and with connections or access to various types of storage elements or objects, across which files may be stored or to which portion(s) of files may be downloaded or migrated. Any computer 10a, 10b, 110a, 110b, etc. may be responsible for the maintenance and updating of a database 20 or other storage element in accordance with the present invention, such as a database or memory 20 for storing data processed according to a date selection of the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 1B:
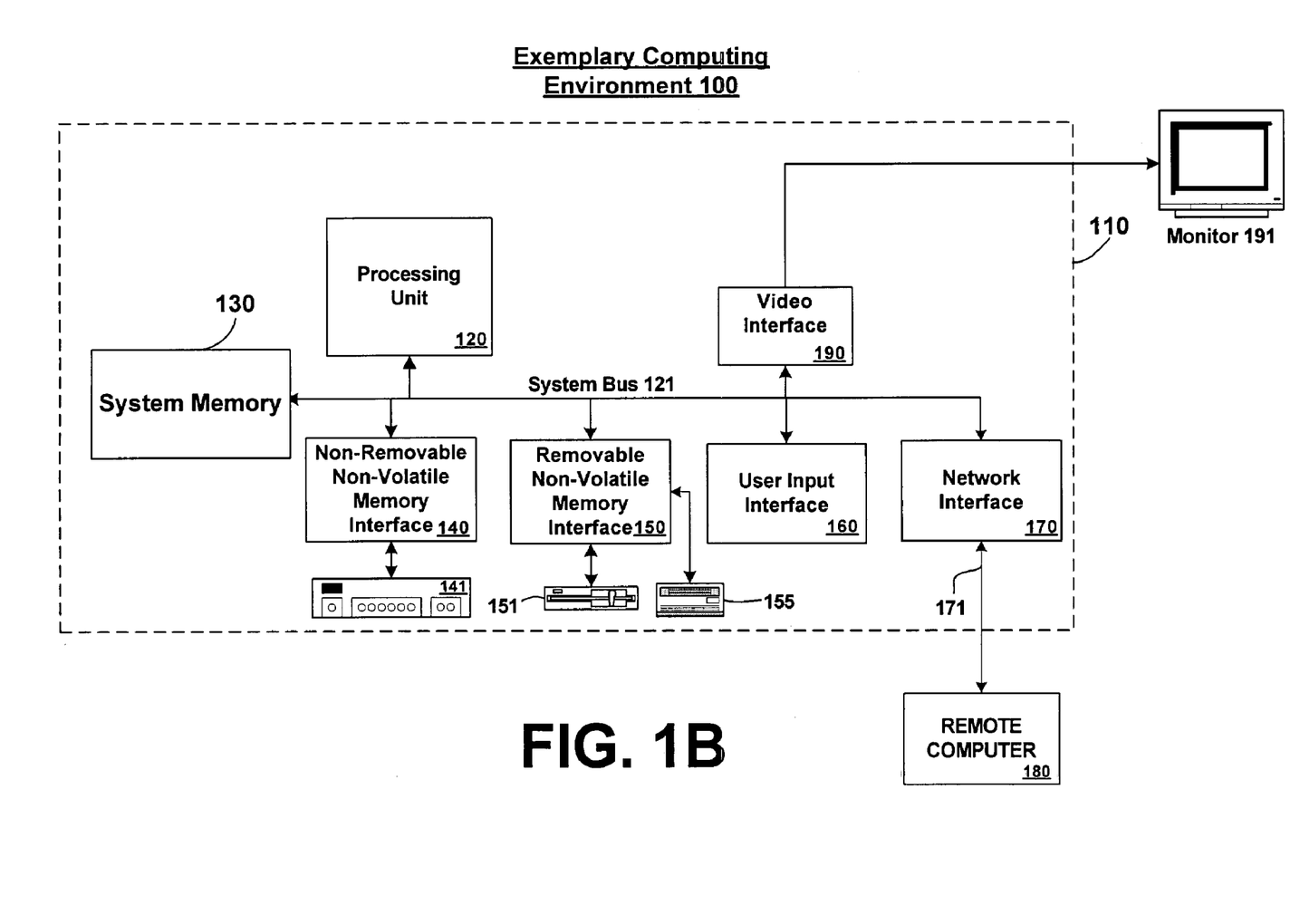
FIG. 1B is a block diagram representing an exemplary non-limiting computing device in which the present invention may be implemented.

FIG. 1B and the following discussion are intended to provide a brief general description of a suitable computing environment in which the invention may be implemented. It should be understood, however, that handheld, portable and other computing devices and computing objects of all kinds are contemplated for use in connection with the present invention. While a general purpose computer is described below, this is but one example, and the present invention may be implemented with a thin client, or stripped down client such as a smart phone, having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved, or where it is desirable to input a date or date range, is a desirable, or suitable, environment for operation of the date selection technique(s) of the invention.

Although not required, the invention can be implemented via an operating system, for use by a developer of services for a device or object, and/or included within application software that operates in connection with date selection in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, described in more detail above, program modules may be located in both local and remote computer storage media including memory storage devices, and client nodes may in turn behave as server nodes.

FIG. 1B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

A user may enter commands and information into the computer 110 through input devices such as a keyboard or pointing device, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190, which may in turn communicate with video memory. In addition to monitor 191, computers may also include other peripheral output devices such as speakers and a printer, which may be connected through an output peripheral interface.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The computer 110 may also include other removable/non-removable, volatile/nonvolatile computer storage media. By way of example only, FIG. 1B illustrates a hard disk drive 141 that reads from or writes to non-removable, nonvolatile magnetic media, a magnetic disk drive 151 that reads from or writes to a removable, nonvolatile magnetic disk, and an optical disk drive 155 that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1B provide storage of computer readable instructions, data structures, program modules and other data for the computer 110.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 10. The logical connections depicted in FIG. 1B include a local area network (LAN) 171 via network interface 170, or alternatively a wide area network (WAN), but may also include other networks/buses. Such networking environments are commonplace in homes, offices, enterprise-wide computer networks, intranets and the Internet.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, an exemplary distributed computing framework or platform includes servers, building-block services, such as Web-based data storage and downloadable device software. Generally speaking, a distributed computing framework provides (1) the ability to make an entire range of computing devices work together and to have user information automatically updated and synchronized in all of them, (2) increased interactive capability for Web sites, enabled by greater use of XML rather than HTML, (3) online services that feature customized access and delivery of products and services to the user from a central starting point for the management of various applications, such as e-mail, for example, or other software, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well. In this regard, the mechanism(s) of the invention may be provided as an integral part of such an application development framework, such that developers can easily include the mechanism(s) in new applications, and easily deliver the UI mechanism(s) to end users as part of various services and applications, for instance, that may search through a variety of data wherever located.

Selection of Date(s) or Date Range

In accordance with the invention, a modular, scalable and reusable "timeline widget" for selecting dates is provided for developers and application providers to use in connection with inputting date(s). As referred to herein, the "specification of date(s)" includes specifying either a single date or a range of dates. In an exemplary implementation, sufficient for a lot of applications, the invention includes resolutions that range from seconds to years. For other unique applications, resolution can be modified accordingly. For instance, in a log of computer processed data recording transaction data every nanosecond, resolution can be tailored to the nanosecond to second range.

Figure 2A:
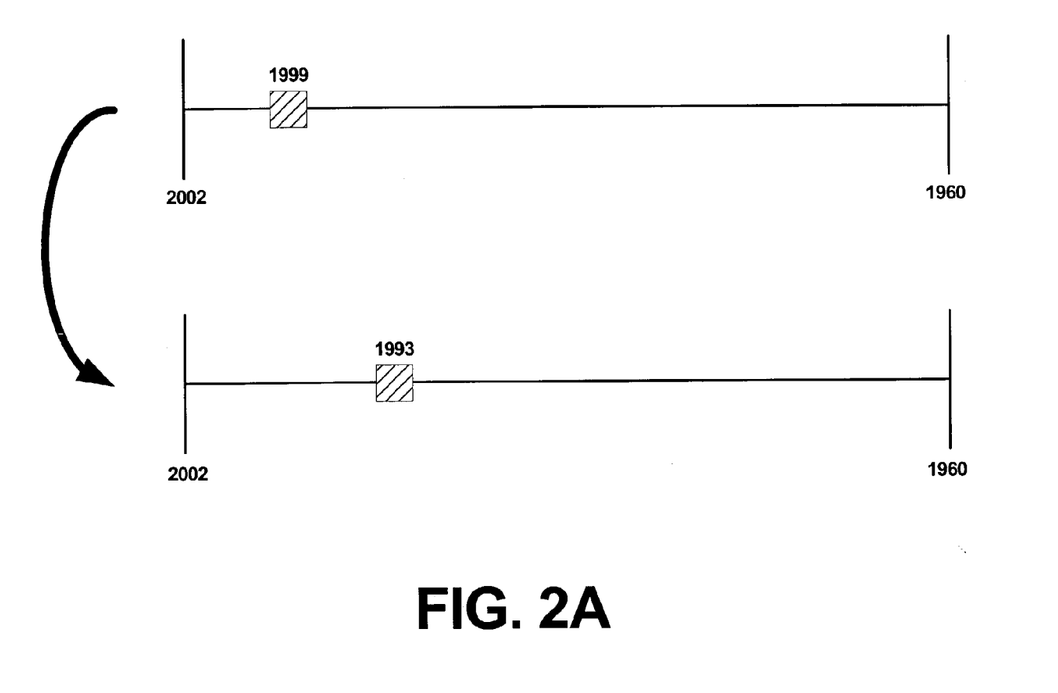
FIGS. 2A to 2C illustrate exemplary non-limiting implementations of a non-linear UI mechanism for selecting a date or a range of dates.

FIG. 2A illustrates a first embodiment of the invention. Two different states of the same user-interface mechanism are illustrated. In this embodiment, the mechanism comprises a timeline and a selector mechanism, such as a selector tab. It is appreciated that the selector mechanism in accordance with the invention can be a line, or some other glyph and that the invention is thus not limited to a tab, but rather the invention contemplates any suitable UI component for allowing a user to select from a timeline. For instance, in the case of a line selector mechanism, a change in user input relative to the line selector mechanism indicates when a user has made a change.

In the embodiment of FIG. 2A, above the selector tab, the currently specified date is presented, although such information can be presented anywhere in the user's view. As the user drags the selector tab to the right or left, the specified date decreases or increases, respectively.

In this regard, FIG. 2A illustrates a non-linear timeline, i.e., the amount of time represented by a given unit of distance on the timeline increases as one moves right on the timeline. Thus, the distance between the left of the time line and the selector tab in the bottom of the figure is twice the distance between the left and the selector in the top. In other embodiments, the date selection of the invention may be practiced in connection with in a multiechelon model, where some component of the date is selected at one level and then that in turn leads to next level of granularity where the selection takes place and so on. If the scale was linear, then one would expect the date specified on the bottom to be 1996, yet in fact the date represented is 1993. Such a scale could also represent data at the micro or milli second level for transactions logs or device level communications, for instance. Thus, the invention contemplates a date range and corresponding granularity suited to the underlying application or service making use of the UI mechanism(s) of the invention. A variety of non-linear functions can be used in this context; the best one depends on the details of the particular application. In addition, the techniques of the invention can be utilized in connection with the selection of future time and setting up future trigger events.

In FIG. 2A, the non-linear function suggested has the following property: the granularity of time increases as one goes further in the past. This approach matches many information-retrieval problems, e.g., e-mail messages. For instance, when searching for recent items, a one-day difference, e.g., today versus yesterday, is significant, but when searching for items from two years ago, one day of difference does not take on as much significance.

Note that the instantiation presented in FIG. 2A can be used as a stand-alone date-selection mechanism, but it can also be used in conjunction with a calendar picker mechanism, in which the mechanism of the invention is used to select a month or a year, while the calendar picker mechanism is used to select a particular day.

Figure 2B:
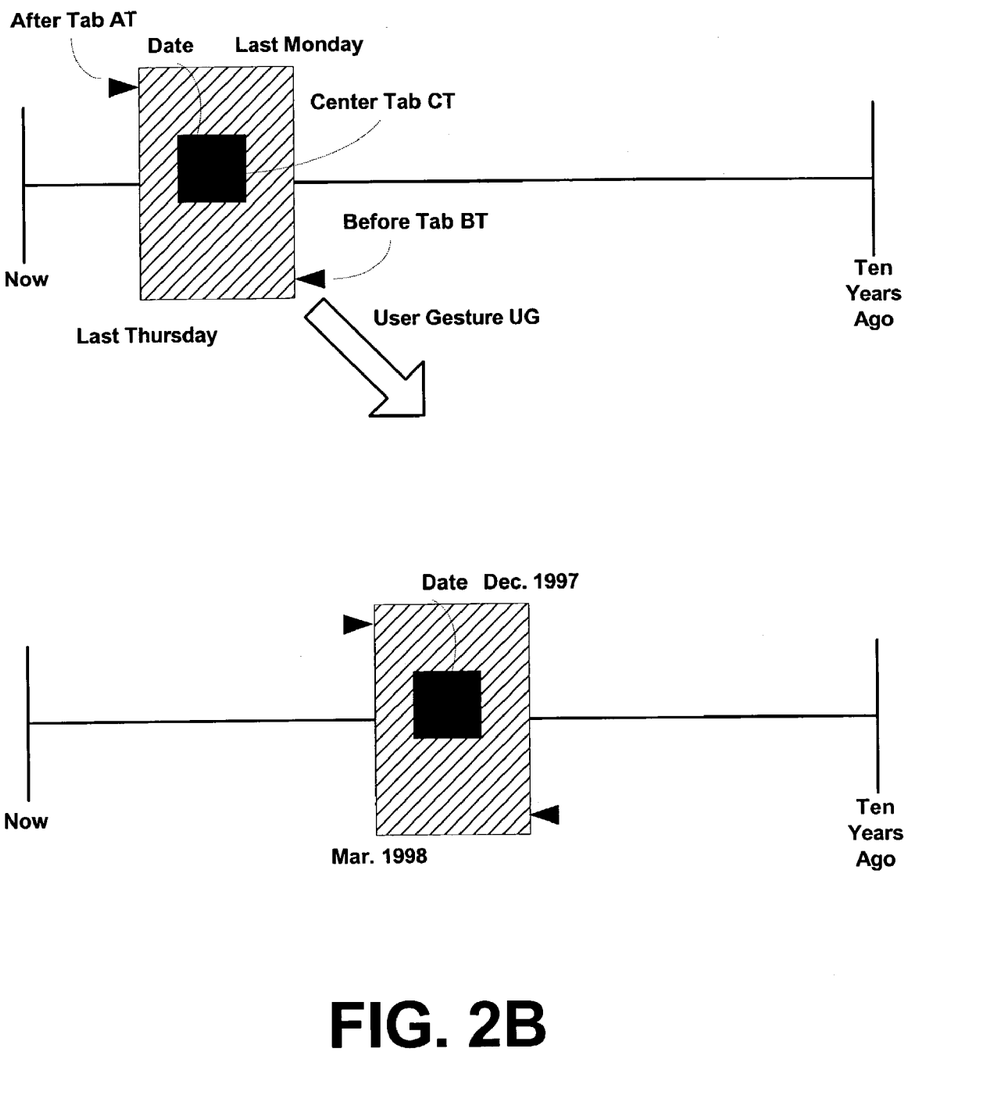

FIG. 2B illustrates a variation of the invention intended for specifying a date range rather than a single date. In this regard, the selection of a date range includes specifying directly or indirectly two dates, an "after" and "before" date between which a user has some interest. In the date range variation, there are three tabs in place of the single selector tab. The before tab BT and after tab AT specify the range of interest; these may be dragged independently of each other to adjust the width of the specified range. In addition, there is a center tab CT, which, when dragged, moves both the before and after tabs with it. In a preferred, but non-limiting, instantiation of this variation, as the center tab CT is moved, the distance between the before tab BT and after tab AT remains constant; on a non-linear timeline, this means the duration of the specified range changes, e.g., as shown in the diagram, as the center tab CT is moved to the right, the duration between the after tab AT and before tab BT increases. In an alternative instantiation, the duration between the after tab AT and before tab BT remains constant, but the distance is changed, which may be appropriate for some applications.

Variations on the embodiments illustrated in FIGS. 2A and 2B include placing the more recent dates to the left and past dates to the right; the opposite arrangement is also equally valid. Where date specifications can include the future as well as the past, the current time is preferably placed between the future and the past dates.

Figure 2C:
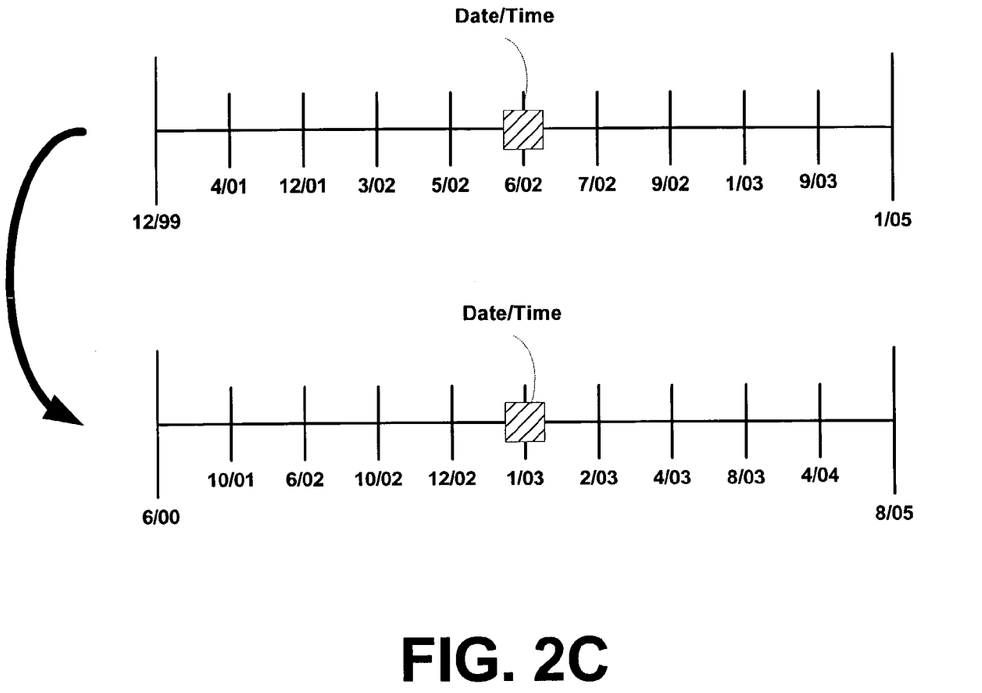

For FIGS. 2A and 2B, it was assumed that the desired granularity is higher, or longer, for past dates than for recent dates. While this is common, sometimes fine granularity is desired for all dates, no matter the relation to the current date. Accordingly, FIG. 2C illustrates a variation that supports such a requirement. In the variation of FIG. 2C, the center of the timeline has fine granularity, while the edges are much coarser. When the user is finished dragging the selector tab and releases it, the selector tab, and possibly the pointer location, is re-centered on the timeline. Thus, selecting a date that is far removed from the current selection can be typically done in two gestures: one to select a date in the rough location of the desired date, and another after the selector tab has been re-centered, to select the date more precisely. As illustrated in the various embodiments of FIGS. 2A to 2C, text (or other indication, such as a calendar/clock image) can be placed adjacent to any one or more of the selector portions of the UI mechanism(s) of the invention that indicates the actual date, or date range, being selected. Moreover, text boxes can be placed adjacent to the various date and date range selector input portions of the invention, whereby if the selector input portions are moved, the text boxes reflect the change in date, or date range. Conversely, if a change is made to the text boxes, the selector input portions are moved accordingly.

Other variations, of course, are possible. The time-line aspect of the proposed invention is different from this existing work in that it provides visual tools for homing into and specifying a date or date-range rather than using dates or time ranges as interfaces to large bodies of temporal information.

Relation of Date(s)

In another aspect, the techniques described above can be augmented in accordance with the invention by utilizing "date relation" techniques. As mentioned earlier, humans often have difficulty remembering dates in absolute tenns, e.g., Jun. 18, 1998, without some great significance to the date or time itself. Instead, people often remember dates in relation to other cues, very often events of some kind, e.g., "when Bob and I went fishing in Minnesota" or "around Thanksgiving holiday last year".

The "date relating" techniques of the invention solve this problem by supplementing the above-described timelines with auxiliary information to help users find a date range of interest. In particular, as the user drags around the various selectors of the above-described timeline mechanisms, the user interface somewhere displays text, images, or sounds related to the currently-selected date range. The events may be public, personal (private) or a combination of multiple events can be combined.

Figure 3:
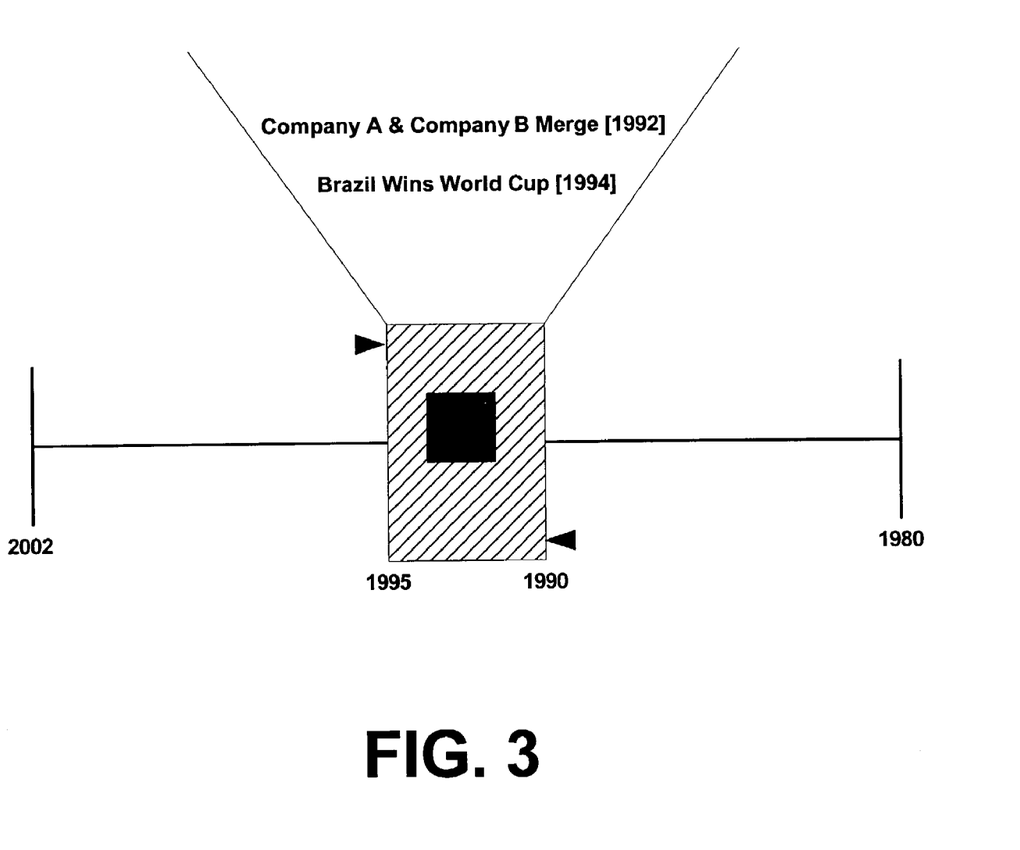
FIG. 3 illustrates an exemplary non-limiting implementation of a date relating UI mechanism for relating events to a date or date range in accordance with the invention.

FIG. 3 illustrates a particular instantiation of the date relating of the invention. In FIG. 3, the UI displays to the user a set of events associated with the range currently selected. As the user moves the selector tab, the displayed events change appropriately. For instance, as the user navigates using the timeline, the date relating mechanism might display a news event, such as the merger of company A and company B, to trigger a user's recollection of other surrounding events. As the user navigates further, another event, such as Brazil's winning of the World cup might be displayed as another triggering event. Moreover, the user may specify via a UI mechanism the types of eventing information to be displayed, e.g., sports news, world news, popular culture items of interest, etc., anything that might give the user a better chance at recalling a time period of interest.

Additionally, to the extent that eventing information has a time granularity associated therewith, the eventing information can be formulated to match the period of granularity being examined by the timeline UI mechanism. For instance, one might remember that some item of interest occurred during the Vietnam War, but not specifically, the dates. The Vietnam War has a granularity of years. The World Series typically takes place over a couple of weeks, and thus the World Series has a granularity of weeks. The Superbowl has a granularity of a few hours on one day. Thus, depending upon the granularity of the range being sought, a user can specify a corresponding granularity of event recall information for "date relating" purposes.

Figure 4:
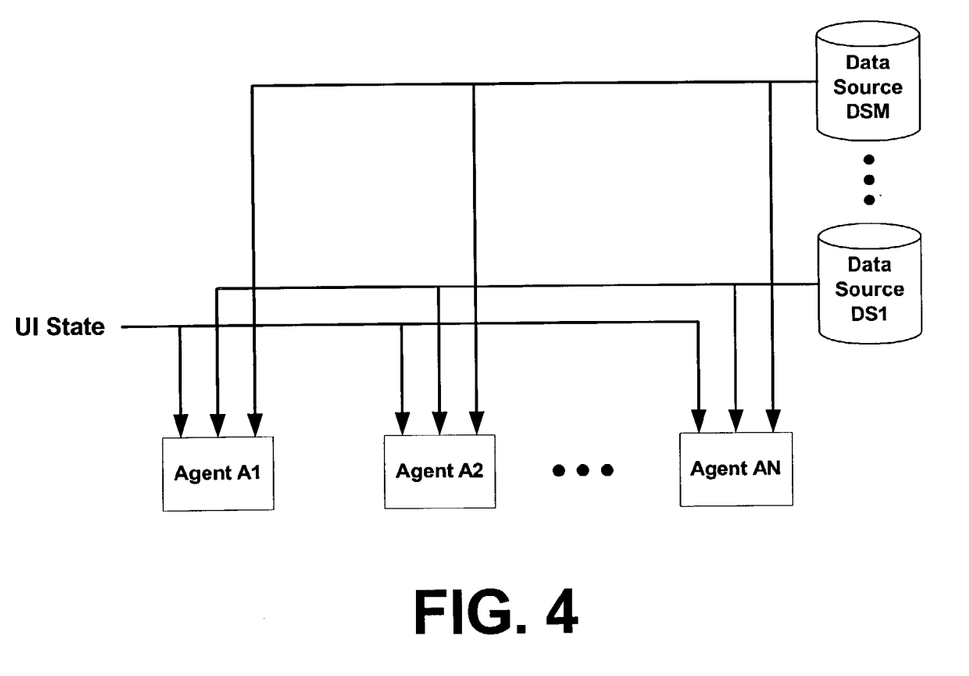
FIG. 4 illustrates an exemplary non-limiting architecture for use in connection with the date relating UI mechanism of the invention.

FIG. 4 presents a general architecture for selecting the events and other content items to be displayed with a mechanism like the mechanism presented in FIG. 3. In this architecture, there are a number data sources DS1 . . . DSm, which contain content that may be presented. These sources might contain information that could be presented directly, e.g., a list of major political events, or they may contain information that requires some processing before it could be displayed, e.g., a collection of the user's e-mail messages.

Each agent A1, A2 . . . AN represents algorithm(s), which distill information in the data source(s) DS1 to DSM, combining it with information from the UI mechanism(s), and outputs specific candidates for presentation, perhaps with some additional metadata such as confidence of applicability.

Finally, an arbiter takes the output of the agents A1 to AN, information about the user, and the UI state and determines the final set of agents to be presented. While this architecture may have some applicability in so-called Artificial Intelligence (AI) systems, it has not been applied to the problem of event selection for date-picking UI mechanisms.

The event-relation aspect of the invention differs from existing work in that it uses events to help users converge onto a date or time range rather than using dates or times range alone as a driver of retrieval for events.

The present invention can thus improve upon any application, e.g., an e-mail client, wherein date selection may be implicated as a portion of a user input process.

While some exemplary embodiments herein are described in connection with software residing on a computing device, one or more portions of the invention may also be implemented via an operating system, application programming interface (API) or a "middle man" object, hardware, firmware, such that a UI or mechanism for date/time selection may be included in, supported in or accessed via any of a distributed computing framework's languages and services. There are thus multiple ways of implementing the present invention, e.g., an appropriate API, tool kit, driver code, operating system, standalone or downloadable software object, etc. which enables applications, nodes, devices and services to use the UI for date selection of the invention. The invention contemplates the use of the invention from the standpoint of an API (or other software object), as well as from a software or hardware object that communicates date selection information. Thus, various implementations of the invention described herein have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to select a date or date range. Thus, the techniques for selecting date(s) in accordance with the present invention may be applied to a variety of applications and devices. For instance, various implementations of the invention may be applied to the operating system of a computing device, provided as a separate object on the device, as part of another object, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the mechanism(s), technique(s) and/or algorithm(s) of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

Still further, the present invention may be implemented in or across a plurality of processing chips or devices, and storage may similarly be effected across a plurality of devices. Moreover, the term difference may be utilized herein to refer to the absolute value of a difference to avoid confusion over negative values resulting from subtracting a value from the future with a value in the past. Therefore, the present invention should not be limited to any single embodiment, but rather should be construed in breadth and scope in accordance with the appended claims.

What is claimed is:

1. A method for selecting a date, comprising:
receiving input that drags a selector input portion of a time indicator user interface component from a first position that is associated with a first time to a second position that is associated with a second time;
as the selector is being dragged from the first position to the second position, changing the time associated with a current position of the selector input portion based on the distance of the current position of the selector input portion from the first position; and
wherein the change in the time associated with the current position of the selector input is non-linear relative to the change in distance of the current position of the selector input portion from the first position.

2. A method according to claim 1, wherein the farther second position is towards the past on the time indicator user interface component, the greater the non-linearity of difference between the second time and the first time.

3. A method according to claim 1, wherein the resolution of said time indicator user interface component ranges from seconds to years.

4. A method according to claim 1, wherein the resolution of said time indicator user interface component ranges from microseconds to years.

5. A method according to claim 1, wherein the current date specified by the selector input portion is presented substantially adjacent the selector input portion.

6. A method according to claim 1, wherein:
the time indicator user interface component includes a timeline; and
said non-linear changing includes changing the amount of time represented by a given unit of distance on the timeline in a non-linear proportion to the amount of distance the selector input portion of the time indicator user interface component is moved.

7. A method according to claim 6, wherein the granularity of time represented by the time indicator user interface component increases as the selector input portion is dragged toward positions that represent further in the past.

8. A method according to claim 1, wherein the amount of change non-linearity is tailored to the application that receives said inputting.

9. A method according to claim 1, wherein the function that is used to produce non-linearity is tailored to the application that receives said inputting.

10. A method according to claim 1, further comprising:
inputting a date selection with a second user interface component.

11. A method according to claim 10, wherein the second user interface component is a calendar picker user interface component.

12. A computer readable storage medium storing computer executable instructions for performing the method of claim 1.

13. A computing device comprising means for performing the method of claim 1.

14. A method for selecting a date range, comprising:
receiving input that specifies a date range via a date range selection mechanism of a date range user interface component;
wherein the date range user interface component includes a first indicator associated with a lower limit date of the date range and a second indicator associated with an upper limit date of the date range;
wherein the date range user interface component further includes a selector input portion; and
receiving input that drags said selector input portion from a first position to a second position; as the selector is being dragged from the first position to the second position, changing the date range associated with a date range user interface component based on the distance of the current position of the selector input portion from the first position; and
wherein the change in the date range associated with the current position of the selector input portion is non-linear relative to the change in the distance of the current position of the selector input portion from the first position.

15. A method according to claim 14, further comprising:
receiving input that changes the date range via moving one of said first indicator associated with the lower limit date and said second indicator associated with the upper limit date.

16. A method according to claim 15, wherein the first indicator associated with said lower limit date and the second indicator associated with said upper limit date are independently movable to variably specify the width of the date range.

17. A method according to claim 14, wherein receiving input that specifies the date range includes receiving input that indirectly specifies said lower limit date and said upper limit date.

18. A method according to claim 14, wherein receiving input that drags the selector input portion includes moving both the first indicator associated with said lower limit date and the second indicator associated with said upper limit date.

19. A method according to claim 18, wherein receiving input that drags the selector input portion (a) does not change the distance between the first indicator associated with said lower limit date and the second indicator associated with said upper limit date and (b) changes non-linearly the duration of time specified by the difference between the time specified by the lower limit date and the time specified by the upper limit date.

20. A method according to claim 18, wherein receiving input that drags the selector input portion (a) changes the distance between the first indicator associated with said lower limit date and the second indicator associated with said upper limit date and (b) does not change the duration of time specified by the difference between the time specified by the lower limit date and the time specified by the upper limit date.

21. A method according to claim 14, wherein said date range selection mechanism of the date range user interface component is one of substantially adjacent to and placed over a non-linear timeline user interface portion.

22. A method according to claim 14, wherein the duration of time specified by the difference between the time specified by the lower limit date and the time specified by the upper limit date has a granularity that is longer for past dates than for recent dates.

23. A method according to claim 14, wherein after receiving input that drags said selector input portion from a first position to a second position, wherein the change in the date range associated with the current position of the selector input portion is non-linear relative to the change in the distance of the current position of the selector input portion from the first position, further comprising:
- displaying at least the portion of the date range selection user interface component represented by the date range at a pre-fixed granularity.

24. A method according to claim 23, wherein the pre-fixed granularity is a granularity of fine resolution relative to the full range of resolution represented by the date range selection user interface component.

25. A computer readable storage medium storing computer executable instructions for performing the method of claim 14.

26. A computing device comprising means for performing the method of claim 14.

* * * * *